United States Patent [19]

Williams et al.

[11] Patent Number: 5,130,034

[45] Date of Patent: * Jul. 14, 1992

[54] CORROSION INHIBITOR AND METHOD OF USE

[75] Inventors: Dennis A. Williams; Phyllis K. Holifield; James R. Looney; Lee A. McDougall, all of Houston, Tex.

[73] Assignee: Exxon Chemical Patents Inc., Linden, N.J.

[*] Notice: The portion of the term of this patent subsequent to Mar. 26, 2008 has been disclaimed.

[21] Appl. No.: 674,612

[22] Filed: Mar. 25, 1991

Related U.S. Application Data

[63] Continuation-in-part of Ser. No. 332,629, Mar. 31, 1989, Pat. No. 5,002,673.

[51] Int. Cl.$^5$ .................... F21B 43/27; C11D 7/48; C23F 11/16
[52] U.S. Cl. .................. 252/8.555; 252/9.552; 252/8.553
[58] Field of Search ............ 252/8.552, 8.553, 8.555, 252/389; 422/12

[56] References Cited

U.S. PATENT DOCUMENTS

| | | | |
|---|---|---|---|
| 3,760,881 | 9/1973 | Kiel | 166/308 |
| 3,773,465 | 11/1973 | Kenney et al. | 422/12 X |
| 3,779,935 | 12/1973 | McDougall et al. | 252/149 |
| 4,028,268 | 6/1977 | Sullivan, 3rd et al. | 252/392 |
| 4,444,668 | 4/1984 | Walker et al. | 252/8.551 |
| 4,498,994 | 2/1985 | Heilweil | 252/8.514 |
| 4,498,997 | 2/1985 | Walker | 252/8.553 |
| 4,522,658 | 6/1985 | Walker | 148/248 |
| 4,541,946 | 9/1985 | Jones et al. | 252/189 |
| 4,552,672 | 12/1985 | Walker | 252/8.553 |
| 5,009,799 | 4/1991 | Syrinek et al. | 252/8.553 |

OTHER PUBLICATIONS

H751, Statutory Invention Registration Publication, Sullivan et al., Mar. 1990.

Primary Examiner—Robert L. Stoll
Assistant Examiner—C. Sayala
Attorney, Agent, or Firm—Robert L. Graham

[57] ABSTRACT

A corrosion inhibitor for an acid well treating composition includes first metal ions including Sb, Cu, and Bi complexed with a quaternary ammonium compound and second metal ions complexed with a quaternary ammonium compound. The complexed compounds may be prepared and introduced into the acid or the first metal ions may be introduced directly into the acid system.

18 Claims, No Drawings

CORROSION INHIBITOR AND METHOD OF USE

CROSS REFERENCE

This Application is a continuation-in-part of U.S. Ser. No. 332,629, filed Mar. 31, 1989, now U.S. Pat. No. 5,002,673.

BACKGROUND OF THE INVENTION

This invention relates generally to corrosion inhibitors and more specifically to corrosion inhibitors containing metal salts for use in acid solutions used in acid treatment of subterranean formations.

DESCRIPTION OF THE PRIOR ART

Acids and acid solutions have long been used in the stimulation of oil wells, gas wells, water wells, and similar boreholes. Acid stimulation is performed in wells completed in subterranean formations. Acidizing is used in conjunction with hydraulic fracturing techniques and matrix acidizing techniques. In both acid fracturing and matrix acidizing, the well treating acid solutions, usually HCl, Hf, or mixtures thereof, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor.

Corrosion inhibitors of diverse description and composition have been proposed over the years for use with well treating acids. Corrosion inhibitors that have received wide spread use are those containing metal/quaternary ammonium complexes. Some of these are described in the following U.S. Pat. Nos: 3,773,465 (cuprous iodide); 4,498,997; 4,522,658; and 4,552,672 (antimony compounds).

In the past, the metal/quaternary complexes, have been used with an acetylenic compound which apparently contributes to the effectiveness of the complex, particularly at high temperatures. Corrosion inhibitors containing acetylenic compounds, quaternary ammonium compounds and metal salts such as antimony chloride or cuprous iodide present two serious problems: (1) the acetylenic compound is highly toxic and (2) the complex is difficult to disperse in the acid. The toxicity problem can be overcome by eliminating the acetylenic compound. The dispersion problem normally required the separate addition to the acid of the corrosion inhibitor formulation (with the acetylenic compound and the quaternary compound) and the antimony compound at the well site during, or immediately prior to, pumping operations.

Efforts to solve these two problems have not been satisfactory.

SUMMARY OF THE INVENTION

The well treating composition and method of the present invention employs a corrosion inhibitor comprising two separate metal ions (binary metals), each complexed with a quaternary ammonium compound. The improved corrosion inhibiting results of the binary metal systems (two complexed metal ions) are believed to be due to each type of complex contributing separately and differently to the total inhibition achieved, thereby increasing the utility of the corrosion inhibitor since it can be used in both HCl solutions and mud acid solutions and in the treatment of wells with carbon steel tubulars or chrome alloy steels.

The well treating composition of the present invention includes an effective amount of a corrosion inhibitor which comprises three principal components:

(a) a mixture of at least two metal ions, a first metal compound is selected from an antimony, bismuth, and cuprous compounds and a second metal ion selected from Ca, Al, Mg, Zn, and Zr ions;

(b) a quaternary ammonium compound capable of forming a complex with the metal ions; and (c) a dispersant or surfactant.

In preferred embodiment, the dispersant or surfactant is provided by a nonionic surfactant (or surfactant blend) having an HLB no. of between 8 and 18 acts (a) as a dispersant to assist in dispersing the corrosion inhibitor and (b) as a wetting agent to render the well tubulars wettable by the well treating composition and corrosion inhibitors.

In accordance with the present invention, the corrosion inhibitor, or components thereof, are introduced into the well treating acid solution at a concentration sufficient to coat the well tubulars and equipment. The concentration of the corrosion inhibitor in the acid solution should generally be sufficient to provide the acid solution with at least 0.08 wt % of the metal ions. The upper limit of the metal ions in the acid solution will be controlled by economies but levels of about 1.5, preferably 1.0 wt %, will be satisfactory for most cases. The mole ratio of the first and second metal ions may range from 1:10 to 10:1 with 1:3 to 3:1 being preferred. The mole ratio of the combined amount for the first and second metal ions in relation to the quaternary compound ranges from 1.4:1 to 1:5 with 1:1 to 1:2 being preferred.

DESCRIPTION OF PREFERRED EMBODIMENTS

As indicated above the well treating composition comprises three principal compounds. Each of these compounds as well as the acid solution in which they are used are described below.

Aqueous Acid Solution

Any of the known oil field acids may be used. These are referred to herein as "well treating acids" and include aqueous solutions of hydrochloric acid (HCl), hydrofluoric acid (HF), mixtures of HCl and HF, acetic acid, formic acid, and other organic acids and anhydrides. The most common well treating acids are 3% HCl, 7½% HCl, 15% HCl, 28% HCl, and blends of HCl and HF (mud acid). Mud acid is normally a blend of 6 to 12% of HCl and 1½ to 6% HF, but may range from 3 to 20 HCl and 0.5 to 9 HF.

Metal Compounds

The function of the metal compounds is to produce ions in the aqueous acid to complex with the quaternary ammonium compound. The complex forms a protective deposit on the metal tubulars and equipment. [Although the metal or metal ion actually complexes with the quaternary compound, these terms (metal compound, metals, or metal ions) are sometimes used interchangeably.]

As mentioned above, the well treating composition and method of the present invention employs two metal compounds (or metal ions thereof):

1. a first metal ion selected from the group consisting of Bi, Sb, and (cuprous), or mixtures thereof; and
2. a second metal ion selected from the group consisting of Ca, Mg, Al, Zn, Zr, Sn, and mixtures thereof.

It is preferred that these ion producing compounds be in the form of metal salts.

Tests have shown that the ions of the above metal salts and mixtures thereof exhibit corrosion protection when complexed with a quaternary ammonium compound or compounds.

The metal salts or mixtures must be soluble in the solvent and form a soluble complex with the quaternary ammonium compound. The term "complex" as used herein means a coordination or association of the metal ion with the quaternary compound.

The metal salts are preferably metal halides, specifically metal chlorides. Some of the salts may be formed in situ. For example, antimony chloride is produced from Sb203 and aqueous acid such as HCl. The insoluble Sb203 is converted to a soluble salt.

As indicated above the antimony is among the most preferred ions. The antimony compound for producing the Sb ion may comprise, for example, antimony trichloride, antimony pentachloride, antimony trifluoride, alkali metal salts of antimony tartrate, antimony adducts of ethylene glycol, and antimony trioxide or any other trivalent or pentavalent antimony compound and the like. As mentioned above, the antimony oxides may be converted to halide salts in the presence of aqueous acid.

The cuprous ion producing compound may be cuprous iodide as described in U.S. Pat. No. 3,773,465, the disclosure of which is incorporated herein by reference.

The bismuth compound may be bismuth trichloride, bismuth triiodide, bismuth trioxide, alkali metal salts of bismuth tartrate, organic acid salts of bismuth such as bismuth subsalicylate or any other bismuth compound and the like. The bismuth trioxide may be converted to the halide salts in the presence of aqueous acid.

The binary and ternary metal mixtures are preferred for particularly severe corrosive environments since they appear to combine synergistically to provide protection. The binary metal salts may be mixed to provide a metal ion in mole ratio of 1:10 to 10:1. Each metal ion of the ternary mixture preferably should be present at a weight ratio of at least one part (preferably 2 parts) of each of the other two compounds per 10 parts of the total ions.

The preferred metal ion mixtures and the mixture ratios are listed below:

| | MOLE RATIO |
|---|---|
| Sb/Ca, Sb/Al, Sb/Mg | 1:1 to 1:10 |
| Cu+/Ca, Cu+/Al, Cu+/Mg | 1:5 to 10:1 |

Quaternary Compounds

The quaternary ammonium compounds (referred to as "quaternary" or "quaternary compounds" herein) employed in the present invention must be capable of complexing with the ions of the selected metal salts. The preferred quaternary comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, quinoline-N-(chlorobenzyl chloride) quaternary, isoquinoline quaternaries, benzoquinoline quaternaries, chloromethyl naphthalene quaternaries and admixtures of such compounds, and the like. The quaternary compound and metal ions may be used in molar ratios of 1:1 to 5:1. Generally, the quaternary compound, because of its higher molecular weight, will be present in the formulation at a higher concentration than the metal compound. The weight ratios of the metal ions and the quaternary compound preferably range from 2:1 to 1:10, preferably 1.7:1 to 1:7, and most preferably 1.4:1 to 1:5.

Solvent

The solvent if used may be a highly polar aprotic solvent, such as dimethyl formamide (DMF), dimethylsulfoxide (DMSO), dimethylacetamide (DMA), 1-methyl-2-pyrrolidone ("pyrrolidone"), tetramethylene sulfone ("sulfolane") and mixtures thereof. In these solvents, the ions of the metal salt are unencumbered permitting the complex to form, The aprotic solvent (e.g., DMF, DMSO, DMA, pyrrolidone, and sulfolane) may be blended with alcohol.

The preferred solvent is DMF or blends of alcohol and dimethyl formamide. Examples of such solvents include dimethyl formamide (DMF), DMF/isopropyl alcohol, DMF/methyl alcohol, DMF/formamide, DMF/formamide isopropyl alcohol, and DMF/formamide/methyl alcohol. DMF preferably constitutes from 50 to 100 wt % of the above solvent blends. The solvent, in certain applications, may be used with the first metal ions.

The Dispersant

In applications where a complex is formed prior to introduction into the acid solutions, it has been found desirable to employ a dispersant. For the first metal ions, an organic amine (including aromatic amines, aliphatic amines, and heterocyclic amines), may be used. The preferred dispersants are aminophenol, aniline, chloroaniline, toluidine, diphenyl amine, picoline, alkyl pyridine, or n-octylamine. It should be noted that the first metal compounds described above may be added to the acid as a formulation or directly to the acid. The dispersant and solvent need not be used in the direct addition process.

For the second metal ions, the surfactant described below may serve as the dispersant.

The Surfactant

The surfactant serves to wet the tubular goods to permit deposition of the quaternary/metal ion complex and also assists in dispersing the second metal ion complexes. The preferred surfactants are the nonionics having hydrophilic—lipophilic balance (HLB) numbers to 8 to 18, preferably 9 to 16 such as laurates, stearates, and oleates. Nonionic surfactants include the polyoxyethylene surfactants, (such as ethoxylated alkyl phenols, ethoxylated aliphatic alcohols), polyethylene glycol esters of fatty, resin, and tall oil acids. Examples of such surfactants are polyoxyethylene alkyl phenol wherein the alkyl group is linear or branched C8 to C12 and contains above about 60 wt % poly oxyethylene. Octyl and nonyl phenols containing 9 to 15 moles ethylene oxide per mole hydrophobe are the preferred ethoxylated alkyl phenol surfactants.

The polyoxyethylene ester of fatty acids include the mono and dioleates and sesquioleates wherein the molecular wt of the esterified polyethylene glycol is between about 200 and 1000.

Polyoxyethylene sorbitan oleates are also useable.

In practice, the nonionics may be blended to provide the desired properties. A particularly useful surfactant is a blend of polyethylene glycol esters of fatty acids and ethoxylated alkylphenols.

Preparation of the Well Treating Composition

The well treating composition is preferably prepared in a tank prior to pumping down the well. The procedure may involve (a) preparing separate formulations for the first and second metal compounds for introduction into the acid solution in the tank, or (b) direct addition of the first metal compound and preparing a formulation for the second metal compound for addition to the tank. Each process is described below.

Separate Addition

The aqueous acid solution is introduced into a tank, typically 3,000 gallons in volume. For the first metal ion complex, the compound for producing the first metal ion, the quaternary compound, the dispersant, and surfactant (if used) are added to the solvent in any order. The concentration of these components may be as described in U.S. Pat. No. 5,002,673, the disclosure of which is incorporated herein by reference.

The formulation for the second metal compound is similarly prepared by adding the metal salt, quaternary compound, and surfactant to a solvent. The concentration of the compounds in the formulation for the first and second metal ion complexes may be as described in U.S. Pat. No. 5,002,673, the disclosure of which is incorporated herein by reference.

The prepared formulations of the first and second metal ions complexed with their respective quaternary compounds are then added to the aqueous acid in the tank and stirred to form a uniform solution or dispersion.

When the tank contents are ready, the well treating operations may commerce. The acid solution with the corrosion inhibitor is pumped down the well and into the formation. The surfactant assists in dispersing the complexes and rendering the metal tubulars water wet to expose the metals to the corrosion inhibitor.

Direct Addition

In the second method of preparing the well treating composition, the preparation and addition of the formulation for the second metal compound may be the same as described above, except, as noted below, an excess of quaternary compound may be used. The first metal compounds may be added directly to the acid solution to produce the first metal ions in the acid in the tank, while stirring the tank contents. The excess quaternary compound added in the formulation of the second metal complexes with the first metal ions. With the contents uniformly complexed and dispersed, the pumping operations for acid treating the well may proceed. The well treating composition is pumped down the well wherein the corrosion inhibitor enhanced by the surfactant wets the tubulars providing corrosion protection therefor. The corrosion inhibitor concentration in the acid solution will range from 0.1 to 10 wt %, preferably 0.2 to 5 wt %, and most preferably 0.5 to 2 wt %, based on the weight of the acid solution.

EXPERIMENTS

In order to demonstrate the effectiveness of the corrosion inhibitors of the present invention, several samples were prepared using various components.

The quaternary ammonium compounds used in the experiments were as follows:
quaternary X-quinoline-N-benzyl chloride quaternary
quaternary Y-alkyl pyridine-N-benzyl chloride quaternary
quaternary Z-quinoline-N-chloromethylnapthyl chloride quaternary The surfactant blend was
3.0 wt parts nonylphenol (10 mols E0)
3.5 wt parts each of
polyethylene glycol (400) dioleate
polyethylene glycol (600) sesquioleate The well treating composition samples in all the experiments were prepared as follows:
(a) One hundred milliliters of the desired strength acid is measured into a test bottle. The acids were as follows: 28% HCl; 15% HCl; and 12/3-% HCl/% HF.
(b) If surfactant in addition to that in the metal ion/quaternary complex formulation is required, it is measured and added to the acid.
(c)
  (i) Metal ion/quaternary complex formulations are measured with a syringe and added to the acid.
  (ii) If the first metal ion is to be directly added to the acid, an approximate weight of the metal compound is weighed and added to the acid. An appropriate volume of the second metal formulation is measured with a syringe and added to the acid.

Corrosion tests using N-80 tubing steel coupons (carbon steel) and CR 2205 (API Specification Grade Duplex containing 21.9 wt % chromium) coupons (chrome alloy steel) were run at conditions indicated on Table I.

TABLE I

|          | TEMP. (F.) | PRES. (psi) | TIME (hrs) | DATA      |
|----------|-----------|-------------|------------|-----------|
| Series A | 250       | 3000        | 4          | Table II  |
| Series B | 250       | 3000        | 2          | Table III |
| Series C | 325       | 3000        | 2          | Table IV  |

The results of the Series A Tests are presented in Table II:

TABLE II

| | SERIES A | | | | | | | |
|---|---|---|---|---|---|---|---|---|
| TEST | QUATERNARY | | | METAL SALT | | | ACID | | CORROSION RATE |
| No. | Type | gms | mMole | Type | gms | mMole | Type | Coupon | lb/ft2 |
| 1-C | X | 1.2 | 4.3 | Sb2O3 | 0.30 | 2.1 | 28% | Cr-2205 | 0.0375 |
| 1 | X | 1.2 | 4.3 | CaCl2 | 0.10 | 0.90 | 28% | Cr-2205 | 0.0205 |
|   |   |     |     | CuI   | 0.13 | 0.68 |     |         |        |
|   |   |     |     | Sb2O3 | 0.08 | 0.55 |     |         |        |
|   |   |     |     | TOTAL | 0.31 | 2.13 |     |         |        |
| 2-C | X | 1.2 | 4.3 | Sb2O3 | 0.30 | 2.10 | 28% | N-80 | 0.0624 |

TABLE II-continued

SERIES A

| TEST No. | QUATERNARY Type | gms | mMole | METAL SALT Type | gms | mMole | ACID Type | Coupon | CORROSION RATE lb/ft2 |
|---|---|---|---|---|---|---|---|---|---|
| 2 | X | 1.2 | 4.3 | CaCl2 | 0.10 | 0.90 | 28% | N-80 | 0.0160 |
|   |   |   |   | CuI | 0.13 | 0.68 |   |   |   |
|   |   |   |   | Sb2O3 | 0.08 | 0.55 |   |   |   |
|   |   |   |   | TOTAL | 0.31 | 2.13 |   |   |   |
| 3-C | Z | 1.2 | 3.7 | Sb2O3 | 0.30 | 2.10 | 28% | Cr-2205 | 0.1021 |
| 3 | Z | 1.2 | 3.7 | CaCl2 | 0.10 | 0.90 | 28% | Cr-2205 | 0.0747 |
|   |   |   |   | CuI | 0.13 | 0.68 |   |   |   |
|   |   |   |   | Sb2O3 | 0.08 | 0.55 |   |   |   |
|   |   |   |   | TOTAL | 0.31 | 2.13 |   |   |   |
| 4-C | Z | 1.2 | 3.7 | Sb2O3 | 0.30 | 2.10 | 28% | N-80 | 0.0265 |
| 4 | Z | 1.2 | 3.7 | CaCl2 | 0.10 | 0.90 | 28% | N-80 | 0.0134 |
|   |   |   |   | CuI | 0.13 | 0.68 |   |   |   |
|   |   |   |   | Sb2O3 | 0.08 | 0.55 |   |   |   |
|   |   |   |   | TOTAL | 0.31 | 2.13 |   |   |   |

The results of the Series B Tests are presented in Table III:

TABLE III

SERIES B

| TEST No. | QUATERNARY Type | gms | mMole | METAL SALT Type | gms | mMole | ACID Type | Coupon | CORROSION RATE lb/ft2 |
|---|---|---|---|---|---|---|---|---|---|
| 5 | Z | 1.0 | 3.1 | CaCl2 | 0.20 | 1.8 | 28% | N-80 | 0.0169 |
|   | Y | 0.2 | 1.3 | Sb2O3 | 0.05 | 0.3 |   |   |   |
| 6 | REPEAT OF 5, REPRODUCES |   |   |   |   |   |   |   | 0.0162 |
| 6-C.1 | Z | 1.0 | 3.1 | CaCl2 | 0.20 | 1.8 | 28% | N-80 | 0.0135 |
|   | Y | 0.2 | 1.3 |   |   |   |   |   |   |
| 6-C.2 | Z | 1.0 | 3.1 | — | — | — | 28% | N-80 | 0.033 |
|   | Y | 0.2 | 1.3 | Sb2O3 | 0.05 | 0.3 |   |   |   |
| 7 | Z | 1.2 | 3.7 | CaCl2 | 0.20 | 1.8 | 28% | N-80 | 0.010 |
|   |   |   |   | CuI | 0.08 | 0.4 |   |   |   |
| 8 | REPEAT OF 7, REPRODUCES |   |   |   |   |   |   |   | 0.011 |
| 8-C.1 | Z | 1.2 | 3.7 | CaCl2 | 0.20 | 1.8 | 28% | N-80 | 0.014 |
| 8-C.2 | Z | 1.2 | 3.7 | CuI | 0.08 | 0.4 | 28% | N-80 | 0.014 |
| 9 | Z | 1.2 | 3.7 | MgCl2 | 0.20 | 2.1 | 28% | N-80 | 0.013 |
|   |   |   |   | CuI | 0.08 | 0.4 |   |   |   |
| 9-C.1 | Z | 1.2 | 3.7 | MgCl2 | 0.20 | 2.0 | 28% | N-80 | 0.015 |
| 9-C.2 | Z | 1.2 | 3.7 | CuI | 0.08 | 0.4 | 28% | N-80 | 0.014 |
| 10 | X | 2.4 | 8.7 | MgCl2 | 0.4 | 4.2 | 15% | N-80 | 0.033 |
| 10-C.1 | X | 2.3 | 8.3 | CuI | 0.5 | 2.6 | 15% | N-80 | 0.037 |
| 10-C.2 | X | 2.3 | 8.3 | MgCl2 | 0.4 | 4.2 | 15% | N-80 | 0.061 |
|   |   |   |   | CuI | 0.5 | 2.6 |   |   |   |
| 11 | X | 1.2 | 4.3 | AlCl3 | 0.3 | 2.2 | 15% | N-80 | 0.037 |
|   | Y | 0.4 | 2.5 | Sb2O3 | 0.1 | 0.6 |   |   |   |
| 11-C.1 | Y | 0.4 | 2.5 | Sb2O3 | 0.1 | 0.6 | 15% | N-80 | 0.380 |
|   | X | 1.2 | 4.3 |   |   |   |   |   |   |
| 11-C.2 | X | 2.4 | 8.7 | AlCl3 | 0.3 | 2.2 | 15% | N-80 | 0.076 |
| 12 | X | 2.4 | 8.7 | AlCl3 | 0.3 | 2.2 | 15% | N-80 | 0.034 |
|   |   |   |   | CuI | 0.5 | 2.6 |   |   |   |
| 12-C.1 | X | 2.3 | 8.3 | CuI | 0.5 | 2.6 | 15% | N-80 | 0.037 |
| 12-C.2 | X | 2.4 | 8.7 | AlCl3 | 0.3 | 2.2 | 15% | N-80 | 0.034 |

The results of the Series C Tests are presented in Table IV:

TABLE IV

SERIES C

| TEST No. | QUATERNARY Type | gms | mMole | METAL SALT Type | gms | mMole | ACID Type | Coupon | CORROSION RATE lb/ft2 |
|---|---|---|---|---|---|---|---|---|---|
| 13 | X | 1.2 | 4.3 | CaCl2 | 0.2 | 1.8 | 15% | N-80 | 0.0174 |
|   | Y | 0.4 | 2.5 | Sb2O3 | 0.1 | 0.6 |   |   |   |
| 13-C.1 | X | 2.3 | 8.3 | CaCl2 | 0.2 | 1.8 | 15% | N-80 | 0.0307 |
| 13-C.2 | Y | 0.4 | 2.5 | Sb2O3 | 0.1 | 0.6 | 15% | N-80 | 0.3804 |
|   | X | 1.2 | 4.3 |   |   |   |   |   |   |
| 14 | X | 2.4 | 8.7 | CaCl2 | 0.2 | 1.8 | 15% | N-80 | 0.0311 |
|   |   |   |   | CuI | 0.5 |   |   |   |   |
| 14-C.1 | X | 2.3 | 8.3 | CaCl2 | 0.2 | 1.8 | 15% | N-80 | 0.0307 |
| 14-C.2 | X | 2.3 | 8.3 | CuI | 0.5 | 2.6 | 15% | N-80 | 0.0371 |
| 15 | X | 1.2 | 4.3 | MgCl2 | 0.2 | 2.1 | 15% | N-80 | 0.0059 |
|   |   |   |   | Sb2O3 | 0.1 | 0.6 |   |   |   |

TABLE IV-continued
SERIES C

| TEST No. | QUATERNARY Type | gms | mMole | METAL SALT Type | gms | mMole | ACID Type | Coupon | CORROSION RATE lb/ft2 |
|---|---|---|---|---|---|---|---|---|---|
| 15-C.1 | Y | 0.4 | 2.5 | Sb2O3 | 0.1 | 0.6 | 15% | N-80 | 0.3804 |
|  | X | 1.2 | 4.3 |  |  |  |  |  |  |
| 15-C.2 | X | 2.2 | 7.8 | MgCl2 | 0.2 | 2.1 | 15% | N-80 | 0.1069 |
| 16 | X | 1.2 | 4.3 | CaCl2 | 0.2 | 1.8 | 15% | Cr-2205 | 0.0057 |
|  | Y | 0.4 | 2.5 | Sb2O3 | 0.1 | 0.6 |  |  |  |
| 16-C.1 | X | 2.3 | 8.3 | CaCl2 | 0.2 | 1.8 | 15% | Cr-2205 | 0.0346 |
| 16-C.2 | X | 1.2 | 4.3 | Sb2O3 | 0.1 | 0.6 | 15% | Cr-2205 | 0.0084 |
|  | Y | 0.4 | 2.5 |  |  |  |  |  |  |
| 17 | X | 2.4 | 8.7 | CaCl2 | 0.2 | 1.8 | 15% | Cr-2205 | 0.0340 |
|  |  |  |  | CuI | 0.5 | 2.6 |  |  |  |
| 17-C.1 | X | 2.3 | 8.3 | CaCl2 | 0.2 | 1.8 | 15% | Cr-2205 | 0.0346 |
| 17-C.2 | X | 2.3 | 8.3 | CuI | 0.5 | 2.6 | 15% | Cr-2205 | 0.0310 |
| 18 | X | 1.2 | 4.3 | MgCl2 | 0.2 | 2.1 | 15% | Cr-2205 | 0.0210 |
|  |  |  |  | Sb2O3 | 0.1 | 0.6 |  |  |  |
| 18-C.1 | Y | 0.4 | 2.5 | Sb2O3 | 0.1 | 0.6 | 15% | Cr-2205 | 0.0084 |
|  | X | 1.2 | 4.3 |  |  |  |  |  |  |
| 18-C.2 | X | 2.2 | 7.8 | MgCl2 | 0.2 | 2.1 | 15% | Cr-2205 | 0.7328 |
| 19 | X | 2.4 | 8.7 | MgCl2 | 0.4 | 4.2 | 15% | Cr-2205 | 0.0428 |
|  |  |  |  | CuI | 0.5 | 2.6 |  |  |  |
| 19-C.1 | X | 2.3 | 8.3 | CuI | 0.5 | 2.6 | 15% | Cr-2205 | 0.0310 |
| 19-C.2 | X | 2.3 | 8.3 | MgCl2 | 0.4 | 4.2 | 15% | Cr-2005 | 0.7786 |
| 20 | X | 1.2 | 4.3 | AlCl3 | 0.3 | 2.2 | 15% | Cr-2205 | 0.0055 |
|  | Y | 0.4 | 2.5 | Sb2O3 | 0.1 | 0.6 |  |  |  |
| 20-C.1 | Y | 0.4 | 2.5 | Sb2O3 | 0.1 | 0.6 | 15% | Cr-2205 | 0.0084 |
|  | X | 1.2 | 4.3 |  |  |  |  |  |  |
| 20-C.2 | X | 2.4 | 8.7 | AlCl3 | 0.3 | 2.2 | 15% | Cr-2205 | 0.7384 |
| 21 | X | 2.4 | 8.7 | AlCl3 | 0.3 | 2.2 | 15% | Cr-2205 | 0.0548 |
|  |  |  |  | CuI | 0.5 | 2.6 |  |  |  |
| 21-C.1 | X | 2.3 | 8.3 | CuI | 0.5 | 2.6 | 15% | Cr-2205 | 0.0310 |
| 21-C.2 | X | 2.4 | 8.7 | AlCl3 | 0.3 | 2.2 | 15% | Cr-2205 | 0.7384 |
| 22 | X | 1.2 | 4.3 | CaCl2 | 0.2 | 1.8 | 12/3 | N-80 | 0.0051 |
|  | Y | 0.4 | 2.5 | Sb2O3 | 0.1 | 0.6 |  |  |  |
| 22-C.1 | X | 2.3 | 8.3 | CaCl2 | 0.2 | 1.8 | 12/3 | N-80 | 0.0838 |
| 22-C.2 | X | 1.2 | 4.3 | Sb2O3 | 0.1 | 0.6 | 12/3 | N-80 | 0.0051 |
|  | Y | 0.4 | 2.5 |  |  |  |  |  |  |
| 23 | X | 2.4 | 8.7 | CaCl2 | 0.2 | 1.8 | 12/3 | N-80 | 0.0755 |
|  |  |  |  | CuI | 0.5 | 2.6 |  |  |  |
| 23-C.1 | X | 2.3 | 8.3 | CaCl2 | 0.2 | 1.8 | 12/3 | N-80 | 0.0838 |
| 23-C.2 | X | 2.3 | 8.3 | CuI | 0.5 | 2.6 | 12/3 | N-80 | 0.0818 |
| 24 | X | 1.2 | 4.3 | MgCl2 | 0.2 | 2.1 | 12/3 | N-80 | 0.0448 |
|  |  |  |  | Sb2O3 | 0.1 | 0.6 |  |  |  |
| 24-C.1 | X | 1.2 | 4.3 | Sb2O3 | 0.1 | 0.6 | 12/3 | N-80 | 0.0051 |
|  | Y | 6.4 | 2.5 |  |  |  |  |  |  |
| 24-C.2 | X | 2.2 | 7.8 | MgCl2 | 0.2 | 2.1 | 12/3 | N-80 | 0.1588 |
| 25 | X | 2.4 | 8.7 | MgCl2 | 0.4 | 4.2 | 12/3 | N-80 | 0.0599 |
|  |  |  |  | CuI | 0.5 | 2.6 |  |  |  |
| 25-C.1 | X | 2.3 | 8.3 | CuI | 0.5 | 2.6 | 12/3 | N-80 | 0.0818 |
| 25-C.2 | X | 2.3 | 8.3 | MgCl2 | 0.4 | 4.2 | 12/3 | N-80 | 0.1300 |
| 26 | X | 1.2 | 4.3 | AlCl3 | 0.3 | 2.2 | 12/3 | N-80 | 0.0242 |
|  | Y | 0.4 | 2.5 | Sb2O3 | 0.1 | 0.6 |  |  |  |
| 26-C.1 | X | 1.2 | 4.3 | Sb2O3 | 0.1 | 0.6 | 12/3 | N-80 | 0.0051 |
|  | Y | 0.4 | 2.5 |  |  |  |  |  |  |
| 26-C.2 | X | 2.4 | 8.7 | AlCl3 | 0.3 | 2.2 | 12/3 | N-80 | 0.1221 |
| 27 | X | 2.4 | 8.7 | AlCl3 | 0.3 | 2.2 | 12/3 | N-80 | 0.0660 |
|  |  |  |  | CuI | 0.5 | 2.6 |  |  |  |
| 27-C.1 |  | 2.3 | 8.3 | CuI | 0.5 | 2.6 | 12/3 | N-80 | 0.0818 |
| 27-C.2 |  | 2.4 | 8.7 | AlCl3 | 0.3 | 2.2 | 12/3 | N-80 | 0.1221 |
| 28 | X | 1.2 | 4.3 | CaCl2 | 0.2 | 1.8 | 12/3 | Cr-2205 | 0.0082 |
|  | Y | 0.4 | 2.5 | Sb2O3 | 0.1 | 0.6 |  |  |  |
| 28-C.1 | X | 2.3 | 8.3 | CaCl2 | 0.2 | 1.8 | 12/3 | Cr-2205 | 0.6384 |
| 28-C.2 | Y | 0.4 | 2.5 | Sb2O3 | 0.1 | 0.6 | 12/3 | Cr-2205 | 0.0228 |
|  | X | 1.2 | 4.3 |  |  |  |  |  |  |
| 29 | X | 2.4 | 8.7 | CaCl2 | 0.2 | 1.8 | 12/3 | Cr-2205 | 0.0683 |
|  |  |  |  | CuI | 0.5 | 2.6 |  |  |  |
| 30 | REPEAT OF 29, REPRODUCES |  |  |  |  |  |  |  | 0.0624 |
| 30-C.1 | X | 2.3 | 8.3 | CaCl2 | 0.2 | 1.8 | 12/3 | Cr-2205 | 0.6384 |
| 30-C.2 | X | 2.3 | 8.3 | CuI | 0.5 | 2.6 | 12/3 | Cr-2205 | 0.0630 |
| 31 | X | 1.2 | 4.3 | MgCl2 | 0.2 | 2.1 | 12/3 | Cr-2205 | 0.0094 |
|  |  |  |  | Sb2O3 | 0.1 | 0.6 |  |  |  |
| 31-C.1 | Y | 0.4 | 2.5 | Sb2O3 | 0.1 | 0.6 | 12/3 | Cr-2205 | 0.0228 |
|  | X | 1.2 | 4.3 |  |  |  |  |  |  |
| 31-C.2 | X | 2.2 | 7.8 | MgCl2 | 0.2 | 2.1 | 12/3 | Cr-2205 | 0.7337 |
| 32 | X | 2.4 | 8.7 | MgCl2 | 0.4 | 4.2 | 12/3 | Cr-2205 | 0.0761 |
|  |  |  |  | CuI | 0.5 | 2.6 |  |  |  |
| 32-C.1 | X | 2.3 | 8.3 | CuI | 0.5 | 2.6 | 12/3 | Cr-2205 | 0.0630 |
| 32-C.2 | X | 2.3 | 8.3 | MgCl2 | 0.4 | 4.2 | 12/3 | Cr-2205 | 0.7323 |
| 33 | X | 1.2 | 4.3 | AlCl3 | 0.3 | 2.2 | 12/3 | Cr-2205 | 0.0111 |

TABLE IV-continued

SERIES C

| TEST No. | QUATERNARY | | | METAL SALT | | | ACID Type | Coupon | CORROSION RATE lb/ft2 |
|---|---|---|---|---|---|---|---|---|---|
| | Type | gms | mMole | Type | gms | mMole | | | |
| | Y | 0.4 | 2.5 | Sb2O3 | 0.1 | 0.6 | | | |
| 34 | REPEAT OF 33, REPRODUCES | | | | | | | | 0.0042 |
| 34-C.1 | X | 1.2 | 4.3 | Sb2O3 | 0.1 | 0.6 | 12/3 | Cr-2205 | 0.0228 |
| | Y | 0.4 | 2.5 | | | | | | |
| 34-C.2 | X | 2.4 | 8.7 | AlCl3 | 0.3 | 2.2 | 12/3 | Cr-2205 | 0.7803 |
| 35 | X | 2.4 | 8.7 | AlCl3 | 0.3 | 2.2 | 12/3 | Cr-2205 | 0.1132 |
| | | | | CuI | 0.5 | 2.6 | | | |
| 36-C.1 | X | 2.3 | 8.3 | CuI | 0.5 | 2.6 | 12/3 | Cr-2205 | 0.0630 |
| 36-C.2 | X | 2.4 | 8.7 | AlCl3 | 0.3 | 2.2 | 12/3 | Cr-2205 | 0.7803 |

Table V summarizes the test results by acid type and metal treated (carbon steel or chrome alloy steel). The % improvement is calculated as follows:

$$\% \text{ improvement} = \frac{CR2 - CR1}{CR2}$$

where CR1 is corrosion rate of mixed metal system;
where CR2 is corrosion rate of single metal system.

TABLE V

| | | | N-80 | | | Cr-2205 | | |
|---|---|---|---|---|---|---|---|---|
| ACID | 1st METAL | 2nd METAL | TEST NO. | AVG. COR. RATE | % IMPROV. | TEST NO. | AVG. COR. RATE | % IMPROV. |
| 28% | Sb/Cu | Ca | 2, 4 | 0.0147 | 44 | 1, 3 | 0.0476 | 32 |
| 28% | Sb | Ca | 5, 6 | 0.0166 | 50 | | | |
| 28% | Cu | Ca | 7, 8 | 0.0108 | 26 | | | |
| 28% | Cu | Mg | 9 | 0.0135 | 7 | | | |
| 15% | Cu | Mg | 10 | 0.0331 | — | 19 | 0.0428 | — |
| 15% | Sb | Al | 11 | 0.0374 | 2 | 20 | 0.0055 | 34 |
| 15% | Cu | Al | 12 | 0.0346 | — | 21 | 0.0548 | — |
| 15% | Sb | Ca | 13 | 0.0174 | 43 | 16 | 0.0057 | 32 |
| 15% | Cu | Ca | 14 | 0.0311 | — | 17 | 0.0340 | — |
| 15% | Sb | Mg | 15 | 0.0059 | 94 | 18 | 0.0210 | — |
| Mud | Sb | Ca | 22 | 0.0051 | — | 28 | 0.0082 | 63 |
| Mud | Cu | Ca | 23 | 0.0755 | 8 | 29, 30 | 0.0650 | — |
| Mud | Sb | Mg | 24 | 0.0448 | — | 31 | 0.0094 | 59 |
| Mud | Cu | Mg | 25 | 0.0599 | 26 | 32 | 0.0761 | — |
| Mud | Sb | Al | 26 | 0.0242 | — | 33, 34 | 0.0076 | 67 |
| Mud | Cu | Al | 27 | 0.0660 | 19 | 35 | 0.1132 | — |

The data on Table V demonstrates that the binary and ternary metal systems provide improved protection for both HCl and mud acid solutions. Note that the binary and ternary metal systems which included Sb gave good results, both in terms of corrosion rate and % improvement, for inhibiting N-80 steel in 15% HCl and mud acid environments and exceptional results in inhibiting corrosion of chrome alloy steels in all acid environments tested.

Although, the well treating composition containing binary metals with Cu were not overall as impressive, they nevertheless offered adequate protection (particularly for carbon steels in 15% HCl and mud acid) and offer the advantage of being far less toxic than Sb compounds.

The present invention has been described in connection with preparing a corrosion inhibitor in or for use in an acid well treating composition. The concepts embodied in the invention include the combining of certain components described herein with commercially available corrosion inhibitors to enhance or extend the effectiveness of commercial corrosion inhibitors. For example, a formulation containing a second metal ion (e.g., Ca, Mg) complex as described herein may be added to an acid solution containing a corrosion inhibitor which includes antimony complexed with a quaternary ammonium compound. The binary mixture of complexed ions significantly improves the effectiveness of the corrosion inhibitor.

What is claimed is:

1. A composition for treating wells having metal tubulars therein, which comprises:
   (a) an aqueous acid solution;
   (b) first metal ions selected from the group consisting of Sb, Bi, Cu (cuprous), and mixtures thereof;
   (c) second metal ions selected from the group consisting of Ca, Mg, Al, Zn, Zr, Sn, and mixtures thereof, the mole ratio of the first metal ions to the second metal ions ranging from 1:10 to 10:1;
   (d) one or more aromatic quaternary ammonium compounds complexed with each of the first and second metal ions, the concentration of the quaternary ammonium compound and the metal ions complexed therewith ranges from 0.1 to 10 weight % of the aqueous acid solution; and
   (e) an effective amount of a surfactant to disperse the complexed metal ions in the acid solution.

2. The composition of claim 1 wherein the quaternary ammonium compound is a mixture of quaternary ammonium compounds.

3. The composition of claim 1 wherein the quaternary ammonium compound complexed with the first metal ion is different than the quaternary ammonium compound complexed with the second metal ion.

4. The composition of claim 1 wherein the acid solution is an aqueous solution of from 3 to 28% HCl and the first metal ion is selected from the group consisting of Sb and Cu (cuprous) and mixtures thereof.

5. The composition of claim 4 wherein the second metal ion is selected from the group consisting of Ca, Al, Mg, and mixtures thereof.

6. The composition of claim 1 wherein the acid solution is a mud acid solution and the first metal ion is Sb compound.

7. The composition of claim 6 wherein the second metal ion is selected from the group consisting of Ca, Mg, Al, and mixtures thereof.

8. The composition of claim 1 wherein the mole ratio of the first and second metal ions and the quaternary compound is between 2:1 to 1:10.

9. A well treating composition comprising:
 (a) an aqueous acid solution;
 (b) a metal ion mixture selected from the group consisting of Sb/Ca and Sb/Cu+/Ca;
 (c) an aromatic quaternary ammonium compound complexed with each of the ions of the mixture, the concentration of the complex of the quaternary ammonium compound and the metal ion mixture ranges from 0.1 to 10 weight % of the aqueous acid solution; and
 (d) an effective amount of a surfactant or dispersant to disperse the complex of the quaternary ammonium compound and the metal ion mixture in the acid solution.

10. A method of treating a well having metal tubulars therein comprising:
 (a) preparing a well treating composition comprising an aqueous acid solution containing corrosion inhibiting amounts of a corrosion inhibitor comprising (i) first metal ions selected from the group consisting of Sb, Cu (cuprous), Bi, and mixtures thereof, (ii) second metal ions selected from the group consisting of Ca, Mg, Al, Zn, Zr, Sn, and mixtures thereof, the mole ratio of the first and second metal ions ranges from 1:10 to 10:1 (iii) one or more aromatic quaternary ammonium compounds complexed with the first and second metal ions forming a quaternary ammonium/first and second metal ions complex, the concentration of which ranges from 0.1 to 10 weight % in the aqueous acid solution, and (iv) an effective amount of a surfactant or dispersant to disperse the quaternary ammonium compound/ first and second metal ions complex in the acid solution; and
 (b) pumping the well treating composition into the well in contact with the metal tubulars.

11. The method of claim 10 wherein a separate quaternary ammonium compound is provided for the first metal ions and the second metal ions.

12. The method of claim 10 wherein the acid solution is selected from the group consisting of aqueous solutions of HCl and mud acid, and the concentration of the corrosion inhibitor is at least 0.1 weight % in the acid solution.

13. The method of claim 11 wherein the mole ratio the metal ions to the quaternary compound ranges from 2:1 to 1:10.

14. The method of claim 13 wherein the acid is aqueous HCl, and the well tubulars are steel, and the metal ions mixture of first metal ion to second metal ion is selected from the group consisting of Sb/Ca, Cu+/Ca, Sb/Cu+/Ca, Sb/Al, Sb/Mg, Cu+/Mg, Cu+/Al, and mixtures thereof.

15. The method of claim 12 wherein the acid is mud acid and well tubulars are chrome steel and the metal ion mixture of first metal ion/second metal ion is selected from the group consisting of Sb/Ca, Sb/Mg, Sb/Al, and mixtures thereof.

16. The method of claim 10 wherein the well treating composition is prepared by adding a first metal salt to the acid solution to form a first metal ion, complexing the second metal ion with an excess quaternary ammonium compound in a concentrated formulation, and then adding the concentrated formulation with the excess quaternary ammonium compound to the acid solution whereby the first metal ion complexes with the excess quaternary ammonium compound.

17. The method of claim 11 wherein the first and the second metal ions are complexed with one of the quaternary compounds prior to introducing into the aqueous acid solution.

18. The method of claim 17 wherein the first and second metal ions are separately complexed with one of the quaternary compound prior to addition to the acid solution.

* * * * *